United States Patent [19]

Boudreau et al.

[11] 4,009,469
[45] Feb. 22, 1977

[54] LOOP COMMUNICATIONS SYSTEM WITH METHOD AND APPARATUS FOR SWITCH TO SECONDARY LOOP

[75] Inventors: Paul Emile Boudreau, Ridgefield, Conn.; Brian Barry Moore, Wappingers Falls, N.Y.

[73] Assignee: IBM Corporation, Armonk, N.Y.

[22] Filed: Dec. 19, 1975

[21] Appl. No.: 642,278

[52] U.S. Cl. .............. 340/147 SC; 340/146.1 BE; 179/15 AL
[51] Int. Cl.² ............... H04Q 9/00; G06F 11/00; G05B 23/02; H04J 3/14
[58] Field of Search ....... 340/147 SC, 147 R, 146.1 BA, 340/146.1 BE; 179/15 AL, 15 BF

[56] References Cited
UNITED STATES PATENTS

| | | | |
|---|---|---|---|
| 3,633,166 | 1/1972 | Picard | 340/147 R |
| 3,886,318 | 5/1975 | Charransol et al. | 340/147 SC |
| 3,904,829 | 9/1975 | Martin et al. | 179/15 AL |

*Primary Examiner*—Donald J. Yusko
*Attorney, Agent, or Firm*—W. S. Robertson

[57] ABSTRACT

This invention relates to a system for communicating between a central station, such as a host processor, and one or more remote stations, such as terminal devices, on a pair of communication loops. A remote station operates normally on a selected one of the loops (the primary loop for the station) and it has access to but does not normally use the other loop (the secondary loop for the station). An improved apparatus and method is provided for switching a remote station from its primary loop to its secondary loop when its primary loop is disabled. Means is provided for a remote station to listen to messages on its secondary loop. For switching the remote stations from a disabled primary loop, a unique command is transmitted on their secondary loop. Remote devices operating with a primary connection to the loop that carries this command recognize the command and respond in a non-interferring way. Remote stations having a secondary connection to the loop respond differently to this command and switch from one loop to the other. In a system called Synchronous Data Link Control (SDLC) the command is thirty-two consecutive 1 bits. The circuitry for detecting this command on a secondary loop is particularly simplified.

6 Claims, 5 Drawing Figures

LOOP COMMUNICATIONS SYSTEM WITH METHOD AND APPARATUS FOR SWITCH TO SECONDARY LOOP

INTRODUCTION

For some applications it is advantageous to connect a host processor and a number of terminals or controllers in a configuration that is called a loop. For generality, the processor or other device that controls the loop will be called a central station and terminals or controllers and the like will be called remote stations. (The term "primary station" and "secondary station" are often used instead of "central" and "remote." The term remote does not imply any particular distance from the central station.) The loop is formed by a coaxial cable or a twisted wire pair or the like that runs from an output port of one station (either a primary or a remote station) to the input port of a next station of the system. A message that is originated by one station appears first at the output port of that station and is then relayed from one station to the next. In loops of the type to which this invention applies, a message from a remote station is directed to the primary station and remote stations do not ordinarily communicate directly with each other.

This invention is particularly intended for a loop configuration that operates under a protocol that is known as Synchronous Data Link Control and is called SDLC. SDLC is described in a publication "IBM Synchronous Data Link Control General Information," GA27-3093-0, available from the assignee of this invention. Some of the features of loops and of SDLC that particularly apply to this invention are summarized in the following paragraphs.

A message is transmitted in a unit of data called a frame. Within the frame there are in sequence a 1 byte (8 bit) address field, a 1 byte control field, and a 2 byte check bit field. This format is used for transmitting commands and is used for the command that is used in this invention. Other formats permit locating information bytes between the control field and the two byte check field and permit extending the address field and/or the control field.

At the beginning and at the end of each frame there is a flag byte. (Between adjacent frames, only one flag is required.) The flag is unique and can be distinguished from any other sequence of 8 bits in a frame. When a station detects this unique flag, it interprets the subsequent bytes as address and control fields and it interprets any two preceding bytes as check bits. The flag is made unique by the requirement that only the flag (there are some other exceptions) can have more than five consecutive 1 bits. Specifically, the flag is the 8 bit byte 0111 1110. (In this specification the bits are grouped in fours to make them easier to read.) Except for the flag, bits on the loop have an extra 0 bit inserted after every five consecutive 1 bits. The data receiving apparatus at a station removes these extra 0 bits from an incoming message. When the encoding system for the data is NRZI, the extra 0 bits maintain clocking: a 1 bit is represented by the continuation of either of two signal levels on the line and a 0 is represented by a transition between these two levels; these transitions are used for synchronizing clocks and they occur at least once in every six bit times in a message.

In the simple example of a loop with SDLC that has been described so far, the reliability of the loop depends on each component in the data transmission path. To improve the reliability of a loop, it has been suggested that two loops be combined so that a secondary station operates primarily on one loop and only secondarily on the other loop. In one type of failure recovery procedure suggested by the prior art there is an operation called "wrap;" the secondary stations on either side of a fault in one loop interconnect their primary and secondary lines so that two smaller, independent, loops are formed. This invention provides a new and improved method and apparatus that permits the remote stations of a loop system to use the operable loop when the other loop has become inoperable.

SUMMARY OF THE INVENTION

This invention provides a new command called "Secondary Switch" for transmission on an operable loop to cause remote stations having a primary connection to an inoperable loop to switch to a primary connection to the operable loop. One object of this invention is to provide such a command in a format that complies with the established SDLC protocol. This object is important because the command will be received by the remote stations that have a primary connection to the loop that carries the command and it would be undesirable to use a command or other control message that would produce a non-standard response from the primary connected stations.

Another object of this invention is to provide a secondary loop circuit that is relatively low in cost and has only a small number of components. Simplifying the circuit reduces the likelihood that the secondary loop circuit itself will be a cause of a loop failure.

According to this invention, a new command frame, Secondary Switch, is made up of a beginning flag, thirty-two consecutive 1 bits, and an ending flag. At a remote station a counter and associated components are connected to a secondary loop to detect this command. As will be explained in detail later, the new command meets the requirements for commands in SDLC, and stations having a primary connection to the loop respond to the command in a non-interferring way. The invention also provides error detection for the circuits that decode the command Secondary Switch. Other objects, advantages and features of the invention will be understood from the description of the embodiment of the invention that is shown in the drawing.

THE DRAWING

THE SYSTEM OF THE DRAWING

Figure 1:
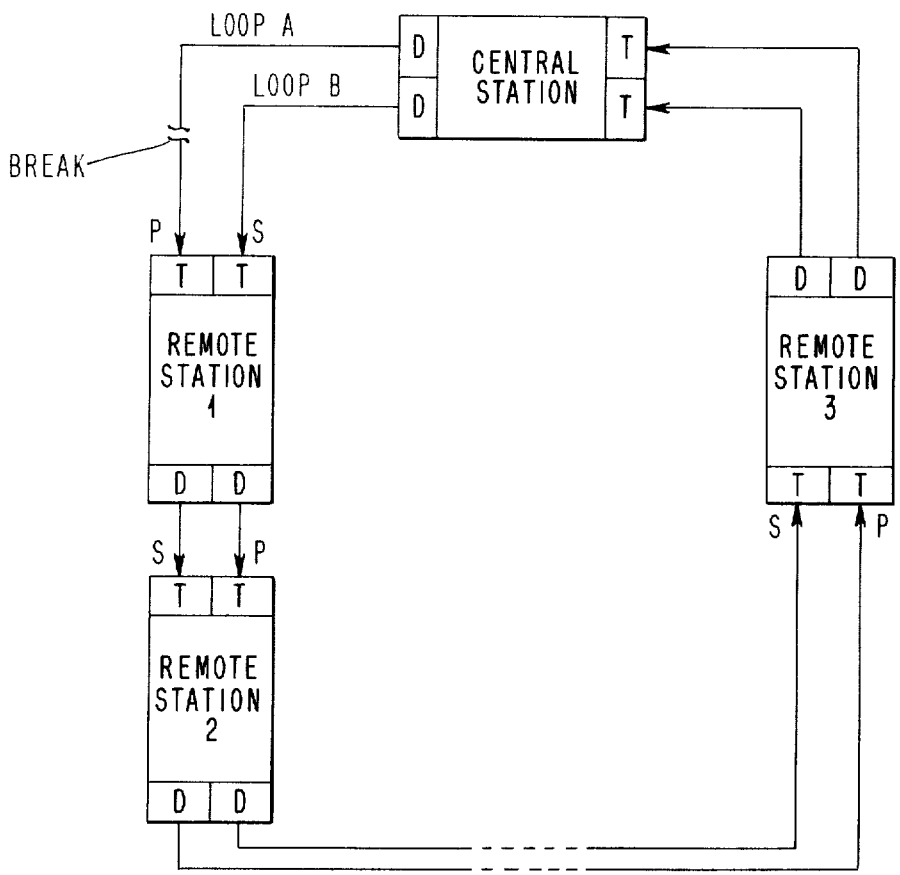
FIG. 1 is a block diagram of a communication system having primary and secondary loops and using the command Secondary Switch.

Introduction — FIG. 1

FIG. 1 is generally similar in terminology and organization to FIG. 1 of U.S. Pat. No. 3,723,971 to W. K. Betts and A. P. Sawtschenko except that it shows a system with two loops which are designated loop A and loop B. A central station has a driver D and a terminator and detector T for each loop, and each remote station also has a driver and a terminator and detector for each loop. Messages originate at the central station or at a remote station and proceed from one station to the next in the direction of the arrows. A remote station operates on only one of the loops, which is called its primary loop; the loop that a remote station is not operating on is called its secondary loop. The input line to a terminator and detector and the output line from a driver each represent a two wire system (such as a twisted wire pair or a coaxial cable) and data is transmitted serially on a loop. As compared with a system having only one loop, the system of two loops in FIG. 1 permits the central station to operate at a high data rate with a large number of remote stations. The method and apparatus of this invention permits using the two loops to improve the reliability of the system.

The inputs to the representative remote stations of FIG. 1 are labeled P and S to show the assignment of each station to one of the loops as the primary loop and the other as the secondary. In this example, remote stations 1 and 3 are assigned to loop A as the primary loop, and remote station 2 is assigned to loop B as the primary loop. The assignment of each of the stations to a particular loop is made on any suitable basis. Similarly, the sequential location of a remote station on its primary loop and on its secondary loop can be made independently on a selected basis.

Suppose that a failure occurs on loop A at the point that is labeled Break. Equivalently, a component failure may occur in remote station 1 so that messages that are received at its line terminator are not reproduced at its line driver. (A loop failure is to be distinguished from a failure at a remote station that does not prevent or interrupt the use of the loop by the other stations.) The central station can easily detect a failure on a loop from the fact that a test message that it starts at its driver is not received at its terminator. The capability of a remote station to detect a loop failure is much more limited. It is a feature of this invention that only the central station detects the failure and that the central station controls the remote stations to overcome the failure. When the failure on loop A in this example is detected, the central station transmits a command Secondary Switch. (described later) on loop B. Stations 1 and 3 which have a primary connection to loop A receive this command on loop B and switch to loop B as their primary loop and (optionally) to loop A as their secondary loop. Remote station 2 receives the command at its primary connection to loop B and takes no significant action. These operations will be described in detail later. After these operations, all of the remote stations have a primary connection to loop B, and loop operations can continue on loop B alone. When the failure has been corrected, the central station addresses selected remote stations on loop B with a command to switch to loop A to restore the system to operation on both loops in a suitably balanced fashion.

Figure 2:
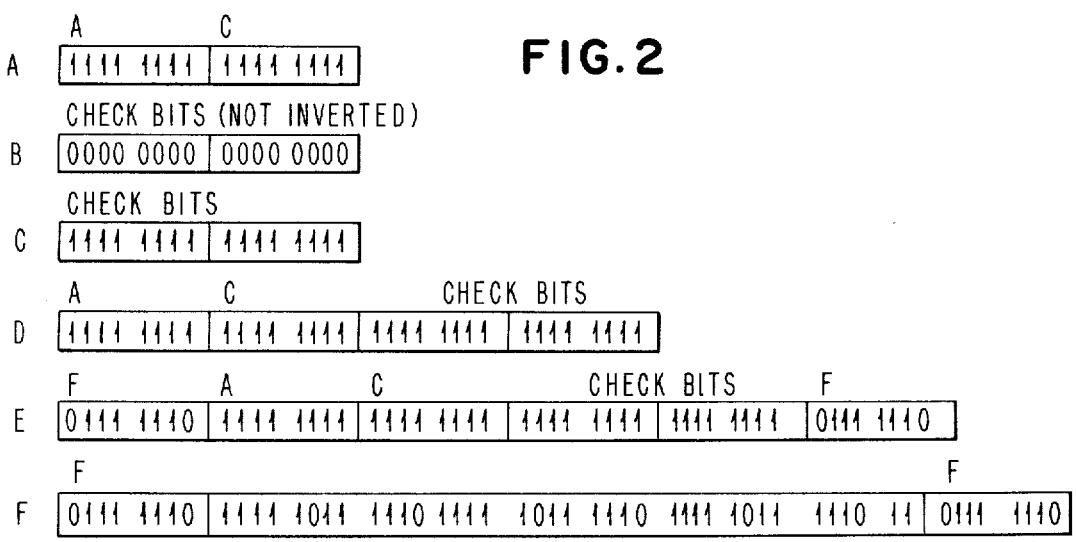
FIG. 2 shows the format of the command Secondary Switch.

The Command Secondary Switch — FIG. 2

FIG. 2 line F shows the command Secondary Switch and the beginning and ending flags with the 0 bits that are inserted to provide clocking and to prevent the unique flag bit sequence from appearing within a message. The command appears in this form on a loop. The 0 bits in line F are represented by transitions between two signal levels and a 1 bit is represented by the absence of a transition at a bit time. Line E shows the command Secondary Switch and the beginning and endings flags without the added 0 bits. Although it is helpful to visualize the command as it is shown in line E, the full message does not necessarily appear in this assembled form at any point in the system.

The first two bytes of the command are an address byte A and a control byte C which are shown in line A of FIG. 2. The address 1111 1111 has been previously established as a broadcast address and it is used in the command Secondary Switch. The control field in the command Secondary Switch is also a byte of all 1 bits, 1111 1111. The choice of these particular address and control bytes is significant to the established operation of a remote station that receives the command on its primary loop and is also significant to the new circuit for decoding this command on a secondary loop, as will be explained later. The central station forms the address and control bytes of the command Secondary Switch in the same general way that it forms addresses and control bytes for other commands.

A check bit generator in the central station operates on the address and control bytes on line A to form two bytes of check bits as shown in line C. The check bit field contains sixteen 1 bits for reasons that will be explained in the next section of this specification. The central station then combines the address field, control field, and check bit field as shown in line D.

The Encoding Operation — FIG. 2

In SDLC, the message bits between the beginning flag and the two check bytes are encoded in a linear feedback shift register. The linear feedback shift register has sixteen stages and the output stage is fed back and combined in an Exclusive OR function with the next bit to be encoded to form the input for the first stage of the register. In addition, there is an Exclusive OR circuit at the input of selected stages of the register and these circuits each receive the bit from the preceding stage of the register and the input to the first stage of the register. At the beginning of an encoding operation in SDLC, the sixteen stages of the register are each set to the 1 storing position. As the 16 1 bits shown in line A of FIG. 2 are applied to the encoder serially, 16 1 bits that were previously set in the register appear serially at the output of the last stage of the register and are fed back to the inputs of the Exclusive OR circuits. Thus, the first stage of the register receives a sequence of 16 0 bits at its input (since $1 \mathbin{\forall} 1 = 0$, where $\mathbin{\forall}$ symbolizes the Exclusive OR function). These 16 0 bits, shown in line B of FIG. 2 are held in the linear feedback shift register at the end of encoding the A and C fields of the command and form the error correction bits for the encoded message, except for the additional operation in SDLC that these bits are inverted, an operation that gives 16 1 bits as shown in line C of FIG. 2. Thus the command Secondary Switch of FIG. 2 line D is a validly encoded message. From the preceding explanation, it can be seen that the encoding operation to produce 16 1 bits of the check bit field from 16 1 bits of the A and C fields is independent of the generator polynomial, which determines the actual arrangement of the feedback connections of the shift register, and that it comes about through the combination of facts that (1) the 16 bits being encoded are all 1 bits, (2) the register is preset to all 1's, (3) the length of the check bit field equals the length of the two fields, A and C, that are to be encoded, (4) premultiplication by $X^{16}$ is used, and (5) inversion of the check bits prior to transmission. Other communications protocols may also provide these features.

This operation can also be understood from a somewhat more formal explanation. When 16 bits have been shifted into the register, the contents of the register can be identified by a vector that is designated $tn$, where $t$ represents a time when the register has been loaded by shifting in sixteen bits, and n represents a number in a sequence of these times. In this example, the vector has the value 1111 1111 1111 1111 at time $t0$ because the register is preset to all 1's at time $n = 0$ to start an encoding operation. To find the contents of the register at time $t1$, the vector $t0$ is first combined with the vector of the encoded bits (line A in FIG. 2) by modulo 2 addition. This logical sum is then multiplied by a matrix (usually called the generator matrix) that depends on the generator polynomial which represents the location of the Exclusive OR circuits in the linear feedback shift register. In this example, the modulo 2 sum of the vector of lines A and a vector of all 1's (the initial state of the register) is an all 0's vector, 0000 0000 0000 0000 (because $1 \forall 1 = 0$, as already explained). Multiplication of this vector of all 0's by the generator polynomial matrix also gives an all 0's vector, as shown in line B of FIG. 2, without regard to the actual value of the generator polynomial.

Figure 3:
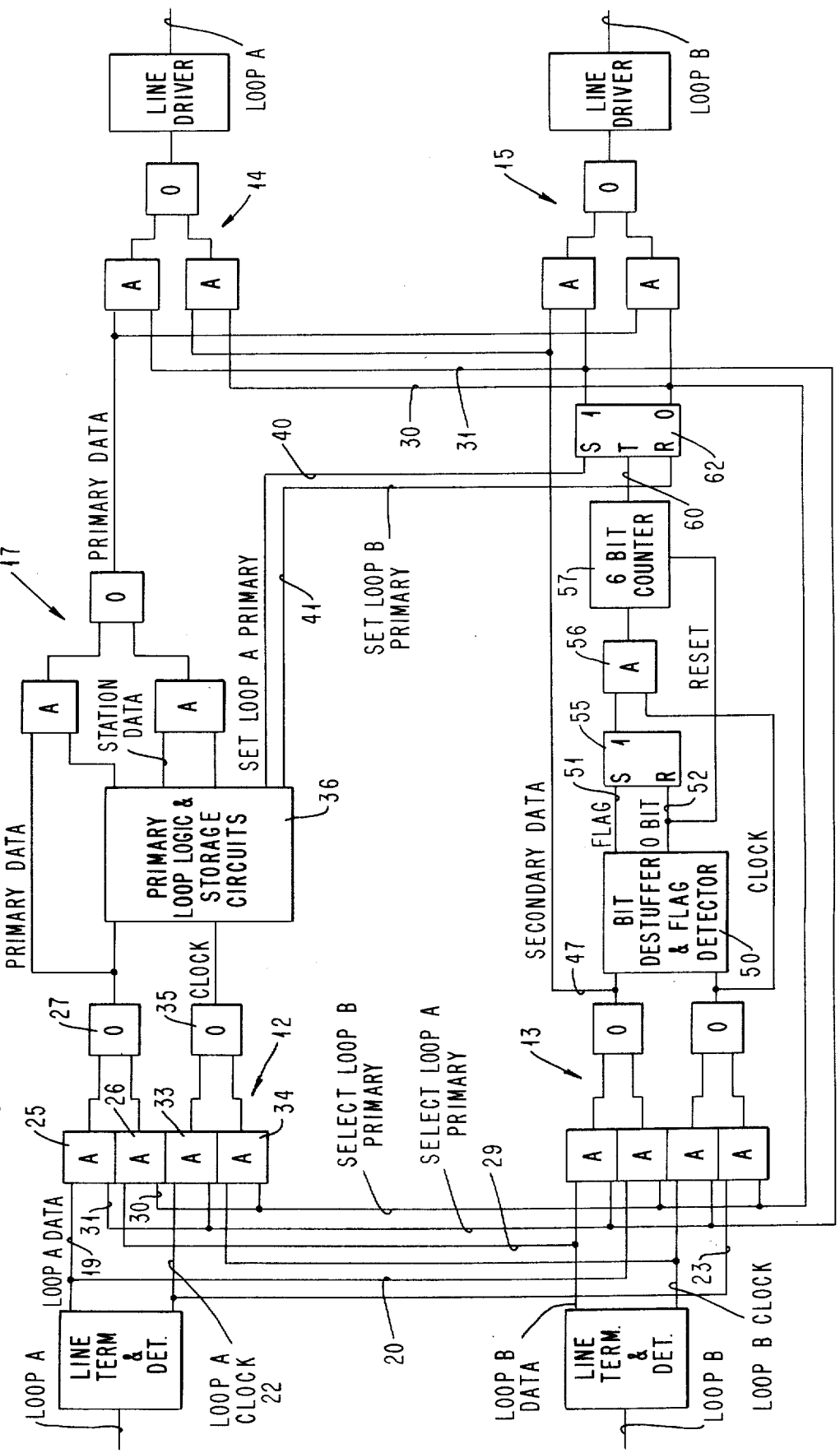
FIG. 3 is a diagram of a remote station with apparatus for detecting and responding to the command Secondary Switch.

The Apparatus of FIG. 3 — Introduction

FIG. 3 shows the circuit of one remote station for responding to the command Secondary Switch. The line terminators, line drivers, and the inputs and outputs for loops A and B will be familiar from FIG. 1, and some of the other components will be familiar from FIGS. 4a, 4b, and 4c of the cited patent to Betts et al. The remote station of FIG. 3 forms a primary connection to one loop and a secondary connection to the other loop by means of a switch system that is shown in the drawing as four component groups 12, 13, 14 and 15. (A generally similar switch system 17 is part of the apparatus of Betts FIGS. 4A, B and C as will be described later.)

Circuit group 12 of the switch selectively connects the primary loop logic and storage circuits of the station of the line terminator and detector for loop A or to the line terminator and detector for loop B. The line terminator and detector receives the waveform that is used on the loop for representing data and converts it into a binary valued voltage levels that are suitable for operating the logic circuits of the drawing. The data signals for loop A for example appear serially on lines 19 and 20. The line terminators and detectors also contain clocks that are synchronized with transitions in the waveform on a loop. The clock signals from loop A appear on lines 22 and 23 and have a 1 logic level pulse representing a valid bit time and a 0 logic level pulse representing an invalid transition interval between data bit times; several clock signals that differ in phase may be used as shown in the cited patent to Betts and as is shown in the decode circuit of FIG. 4.

Component group 12 of the switch has two AND gates 25 and 26 and an OR gate 27 that receive the loop A data on line 19 and the loop B data on a line 29 and respond to two control signals, Select Loop B Primary on a line 30 and Select Loop A Primary on a line 31 to connect the primary loop logic and storage circuits of the station to receive data from either loop A or loop B. Similarly, AND gates 33, 34 and OR gate 35 respond to the control signals on lines 29 and 30 to transmit the clock signal (or several clock signals of a differing phase) from the selected loop to the primary loop logic and storage circuits of the station.

The remote station has the conventional primary logic and storage circuits that are represented in block 36. These circuits respond to the data and clocking signals from the selected primary loop to perform the normal operations of a secondary station. Switch 17 of the primary logic and storage circuits is shown in detail because it is a useful reference for other components of the drawing. When a message is addressed to a different station or to all stations, switch 17 is controlled to transmit the message to a line driver; in other operations switch 17 is controlled by the primary logic and storage circuits to transmit messages that originate at the remote station of FIG. 3. A later section of this specification will describe the response of the primary loop logic and storage circuit to the command Secondary Switch on its primary connected loop. The remote station also responds to a conventional command on its primary loop to switch to the secondary loop and the logic and storage circuit 36 produces a 1 logic level signal on a line 40, Set Loop A Primary, or on a line 41 to set loop B as the primary loop.

Component group 13 of the switch is similar to component group 12 and responds to control signals on lines 30 and 31 to supply the data and clock signals from either loop A or loop B to the circuits that decode the command Secondary Switch. Switch component groups 14 and 15 also respond to the signals on lines 30 and 31 and connect the line drivers to receive the output signals for the selected loop. The components of the terminal of FIG. 3 that have been described so far are conventional in terminals that are adapted to operate with a selected one of two loops.

The Apparatus of FIG. 3 — The Secondary Switch Decode Circuits

The components for decoding this command will be introduced as they appear in the sequence of the operation of decoding a command Secondary Switch that appears on the loop to which the station has a secondary connection. The command Secondary Switch and other communications with remote stations having a primary connection to this loop appear at a line 47 and thus at an input of components 14 and 15 of the switch for transmission to the line driver for the secondary loop of the terminal. Data at the input of the secondary loop thus is transmitted to the next station on the loop without regard to the position of the switch or the occurrence of the command Secondary Switch. The data signals on line 47 and clocking signals that are provided by the line terminator and detector are applied to a conventional bit destuffer and flag detector 50. The command Secondary Switch on line 47 is shown in line E of FIG. 2. Component 50 produces a 1 logic level signal on line 51 when a flag has been detected, and then the next bit is the first bit of the address field of a message. Component 50 also produces a 1 logic level signal on a line 52 on the occurrence of each 0 bit in the data.

A latch 55 is connected to be set in response to the flag signal on line 51 and to be reset in response to a 0 bit signal on line 52. A gate 56 responds to the set state of latch 55 to transmit clock signals from the line terminator and detector to a 6 bit counter 57. Counter 57 is connected to be reset in response to a 0 bit on line 52. Thus, at the beginning of a frame containing the command Secondary Switch, counter 57 and latch 55 are reset from a 0 bit in the flag or in the immediately preceding message. Latch 55 is set at the end of the flag and gate 56 begins transmitting a clock pulse to counter 57 at each bit time. With the first clock pulse, counter 57 advances from the count 000000 to the count 000001 and continues in the usual counting sequence. After 31 clock pulses, the counter holds the value 011111 and with the 32nd pulse it advances to the value 100000. The output 60 of counter 57 carries the binary voltage level for the logic state of the last stage of the counter and this output is a logical 0 for count values below 32 and is a logical 1 for a count value of 32. Thus, latch 55, gate 56 and counter 57 provide a particularly simple decoder for the command Secondary Switch.

For every other command or message on the secondary loop, the components of FIG. 3 go through the beginning of the operation that has just been described for decoding the command Secondary Switch. However, on the occurrence of a 0 bit, latch 55 is reset to close gate 56 and stop the counting operation and latch 57 is reset in preparation for the same operation on the next frame.

From the more general standpoint, the components 55, 56 and 57 detect the command Secondary Switch by counting a sequence of 32 1 bits following a flag. (It is possible for a non-command message to have 32 1 bits immediately preceding a flag.) Counting functions occur in other apparatus, and several variations of the circuit that is specifically shown in the drawing will be apparent to those skilled in the art.

When the command Secondary Switch has been decoded, the switch is operated to switch the terminal to the other loop as its primary loop and, optionally, to switch to the original loop as a secondary loop. In the circuit of the drawing, a trigger circuit 62 produces the signal Select Loop A Primary at its 1 output and the signal Select Loop B Primary at its 0 output. The signal on line 60 signifying that the command Secondary Switch has been decoded is applied to a trigger input of circuit 62 to reverse the control signals to the switch.

Preferrably circuit 62 also receives a signal Set Loop A Primary on line 40 at its set input and signal Set Loop B Primary on a line 41 at its reset input. These commands are transmitted on a primary loop and are conventionally decoded by the primary logic and storage circuits of the terminal.

As is conventional, trigger circuit 62 may comprise a set-reset latch (like latch 55) with gate circuits at its set and reset inputs that respond to the two outputs 30 and 31 to direct the pulse on line 60 to the appropriate input to switch the latch to its opposite state. From a more general standpoint trigger 62 provides means for storing and/or controlling the present state of the switch 12, 13, 14, 15 and it includes means operable to switch this state after the command Secondary Switch has been decoded. These various functions may be provided by various well known components and/or combined with other components such as switch 12, 13, 14, 15.

Notice that the decoding circuit for the command Secondary Switch in effect has the same error detection capability for this command as the primary logic and storage circuits do. An invalid command will be rejected at the remote station having a secondary connection because it will contain at least one 0 bit. The central station will also receive the command at its input port and will check it for errors and it will retransmit the command if an error is found. (Additional error detection capability is provided in the decoder circuit of FIG. 4 which will be discussed later.)

The Secondary Switch — Operation on the Primary Loop

Suppose that the command Secondary Switch is applied to the primary loop of the terminal of FIG. 3. It is an advantageous feature of this invention that the command appears to the remote station as a valid command but that it does not lead to any undesirable action by the remote station. The remote station decodes the address portion of the command as the broadcast address and it thereby controls gate 17 to transmit this message from a line terminator and switch component group 12 to the line driver that is previously selected by switch components 14 and 15. Thus, a primary connected station does not interfere with transmitting this message to all other stations having either a primary or a secondary connection to the loop. The error detection components of the remote station operate on the address and command fields and on the two check bytes and signal that the frame has been validly received, or it will detect an error if a detectable error has occurred in the message. As part of the normal response to this command, the remote station sends an acknowledgement to the central station. However, the control byte 1111 1111 is not a previously established command and the remote station takes no other specific action in response to the command.

Figure 4:
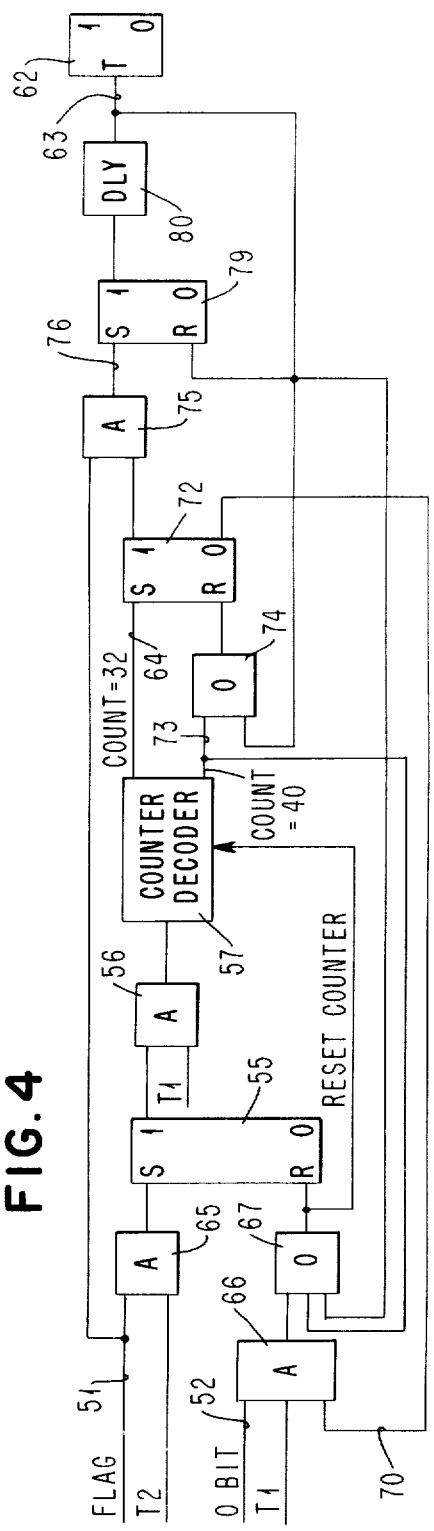
FIG. 4 is a diagram of apparatus for detecting and responding to the command Secondary Switch with means for additional error detection and other functions.
Figure 5:
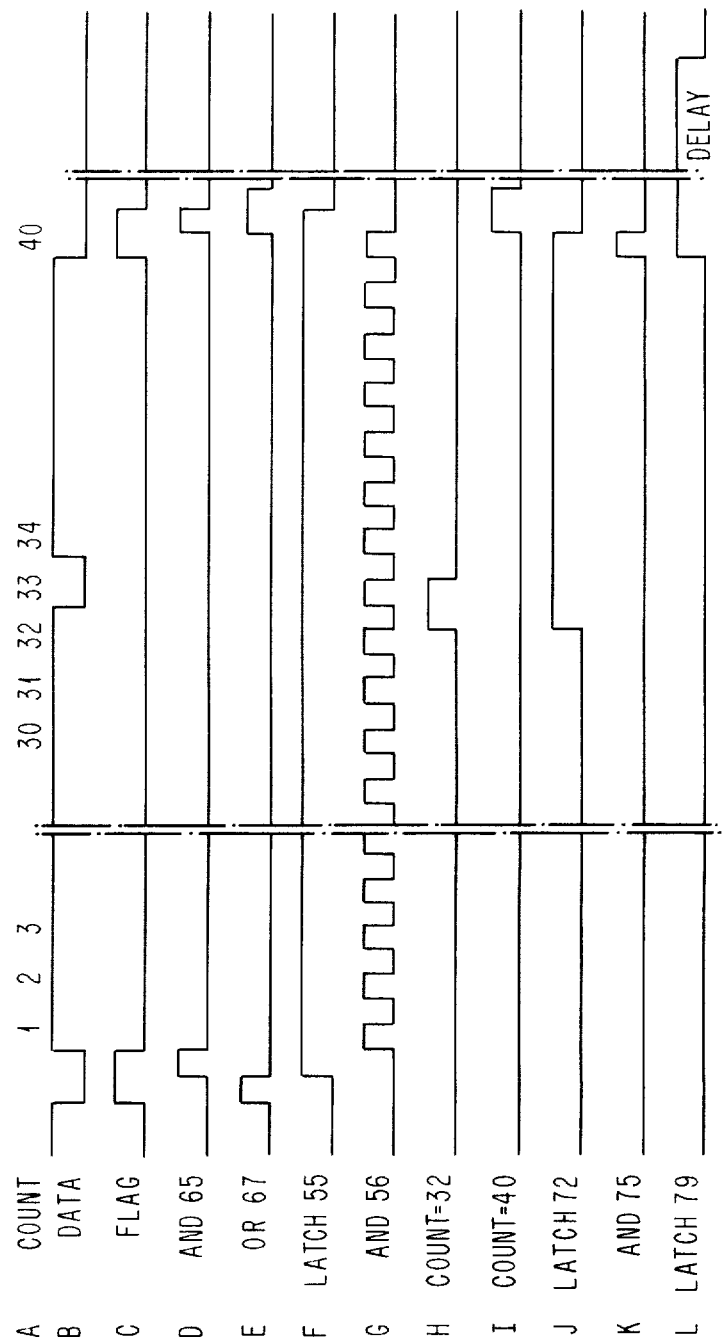
FIG. 5 shows a series of timing waveforms that show the operation of the apparatus of FIG. 4.

Additional Error Detection — FIGS. 4 and 5

As the Secondary Switch decode circuit has been described so far, it responds to the unique command frame in which 32 1 bits follow a flag. Except for an invalid data message, this bit configuration is unique and there is no valid sequence of bits within any other message that will cause the Secondary Switch operation. However, it is possible through error for the first two bytes of a different message to have all 1 bits and for the next 8 bytes in a data message to have all 1 bits. When such an error message appears on the primary loop, error detection components of circuits 36 detect the error and prevent an undesired response. The additional apparatus shown in FIG. 4 provides this capability for the Secondary Switch decode circuit.

The circuit detects the sequence of a beginning flag, 32 consecutive 1 bits and an ending flag and it makes no response to other frames. Every data frame is longer than the command frame Secondary Switch because it has one or more data bytes between the control field and the check bit field. Thus an invalid data message might have a beginning flag followed by 32 consecutive 1 bits and it would not have a flag following these 32 consecutive 1 bits.

Because the circuit of FIG. 4 is somewhat more complex than the Secondary Switch decode circuit of FIG. 3, the timing for a clock having two phases T1 and T2 is shown. (A multiple phase clock is conventional in apparatus of this general type and is explained in the cited patent to Betts et al.) Latch 55, AND gate 56, counter 57 and trigger 62 will be familiar from the description of the Secondary Switch decode circuit of FIG. 3. Also, it can be seen that a line 64 corresponds to the output 60 in FIG. 3 of counter 57 and that a line 63 corresponds to the same line 60 as an input to trigger circuit 62.

Line B in FIG. 5 shows the data on the secondary loop for the last few bits of a beginning flag, the 32 consecutive 1 bits (destuffed) for the command Secondary Switch, and the 8 bits of the ending flag. Line A in FIG. 5 shows the contents of counter 57 during the decode operation. Other lines in FIG. 5 will be referred to as the corresponding components appear in the following description of FIG. 4.

An AND gate 65 connects latch 55 to be set at time T2 in response to a flag pulse on line 51. An AND gate 66 and an OR gate 67 connect latch 55 to be reset at clock time T1 on the coincidence of a 0 data bit and a 1 logic level signal on a line 70 (which is described later). A 0 bit appears in the data on line 52 with a flag pulse on line 51, and the T1 and T2 phase clock signals assure that latch 55 will set in response to a flag pulse. (Similar gates can be provided for the latch 55 in the circuit of FIG. 3 if the latch is not otherwise constructed to set rather than reset when signals appear at both its inputs.)

In the conventional construction for counter 57, there are an input latch and an output latch for each bit position. The input latches of the counter are connected to respond to T1 phase clock signals that are supplied by AND gate 56 (see line G of FIG. 5) and the output latch for each bit position responds to a T2 phase clock signal (not shown). Thus, as lines H and I of FIG. 5 show, transitions in the counter output occur at time T2. These lines in FIG. 5 also show that the counter values are conventionally decoded to produce an output pulse only for the duration of the selected count.

A latch 72 is connected to be set in response to the signal Count = 32 on line 64. Thus, latch 72 is set on the occurrence of 32 1 bits following a flag in the same general way that trigger 62 in FIG. 3 is triggered in response to this sequence of bits. Latch 72 records the occurrence of this condition for an interval of 8 bits that is provided for detecting the ending flag in a valid Secondary Switch command. The 0 output of latch 72 forms input 70 to AND gate 66. When latch 72 is set at the end of 32 consecutive 1 bits following a flag, the signal on line 70 falls and line 70 inhibits latch 55 from being reset in response to a 0 data bit during the following 8 bit times. Thus, counter 57 continues to advance and it provides an output Count = 40 on a line 73 at the time when a flag pulse will appear on line 51 for a valid Secondary Switch frame. See FIG. 5, line I. In a valid command Secondary Switch, a flag pulse appears on line 51 at this time. An AND gate 75 responds to the coincidence of the set state of latch 72 and the flag on line 51 to produce a pulse at its output 76 at the end of a valid Secondary Switch frame. See FIG. 5, lines J and K. An OR gate 74 connects latch 72 to be reset in response to this counter output (or in response to a signal 78, described later).

An invalid data message that might through error have 32 consecutive 1 bits following a flag would not have a flag following these 32 bits, and a flag pulse would not appear on line 51 at counter time 40. In this situation, a pulse would not appear at the output 76 of AND gate 75, and the reset state of latch 72 would permit latch 55 and counter 57 to be reset on the next flag to begin the operation that has just been described for the next frame. Counter 57 is reset at time T2 of count 40.

The operation of switching a remote station from its primary loop to its secondary loop produces noise on both loops, and it is desirable to delay this switching operation until the command Secondary Switch has propagated sufficiently down the loop for other stations to receive the command without interference that would be produced by the switching operation. The time for this delay may be a few milliseconds. A latch 79 and a delay device 80 (conventionally, an oscillator, a counter, and a decoder for a selected count value) receive the signal on line 76 and produce a corresponding but delayed signal at input 65 of trigger circuit 62. See FIG. 5, line L. Latch 79 and delay device 80 may similarly be connected between counter 57 and trigger 62 in the apparatus of FIG. 3. Preferably, these components also provide a reset pulse for latches 55, 72, 79 and counter 57.

Considered from another standpoint, the flag detector 50 serially decodes flags, the latch 55 and counter 57 and related components serially decode the four bytes of the command Secondary Switch, and the counter 57 and latch 72 and related components serially decode the ending flag. Equivalently, a decoder circuit may have a 48 bit serial shift register that receives the flag bits and data bits on line 47 (in FIG. 3) and a parallel decoder that detects the occurrence of the command frame Secondary Switch in the register. Appropriate apparatus for combinations of serial and parallel decoding will be readily apparent.

From this description of a preferred embodiment of the invention, those skilled in the art will recognize a range of variation in implementation of the invention within the spirit of the invention and the scope of the claims.

What is claimed is:

1. In a loop communication system wherein a remote station has switching means for making a primary connection to a selected one of two loops and a secondary connection to the other of said two loops and wherein a central station has means for transmitting command frames having a beginning flag, 32 bits, and an ending flag, the improvement comprising,
   means at a remote station for detecting the occurrence on said other loop of a flag followed by 32 consecutive 1 bits of a command frame Secondary Switch,
   means responsive to said detecting means for operating said switching means to switch said remote station of a primary connection to said other loop when said control station transmits the command frame Secondary Switch on said other loop.

2. The system of claim 1 wherein said means responsive to said detecting means includes means for providing a predetermined delay between said occurrence of the command Secondary Switch and the operation of said switching means, whereby noise associated with said switching operation does not interfere with the response of other stations on said loops to said command.

3. The system of claim 1 wherein said means for detecting includes means for detecting the occurrence of an ending flag immediately following said 32 consecutive 1 bits, whereby an invalid data message having a beginning flag and 32 consecutive 1 bits but not an immediately following ending flag is rejected.

4. The system of claim 3 wherein said flag has 8 bits and wherein said means for detecting includes a counter, means for resetting said counter in response to a flag, means for incrementing said counter during each bit time following a flag, and means responsive to the coincidence of consecutive 1 bits through a count of 32 and the occurrence of a flag at a count of 40 for signalling said means responsive to said detecting means.

5. The system of claim 4 wherein said means for detecting includes means for resetting said counter on the occurence of a 0 bit through a count of 32.

6. In a loop communication system using Synchronous Data Link Control discipline for the management of information transfer over first and second loops between a central station and a plurality of remote stations, each remote station having switching means for making a primary connection to a selected one of said two loops, apparatus for switching remote stations having a primary connection to a disabled one of said loops to the other of said loops in response to a command frame, Secondary Switch, transmitted on said other loop, comprising for each of said remote stations,
 means for detecting flags and data transmitted on said other loop, and
 means responsive to the occurrence in sequence of a beginning flag, 32 consecutive 1 bits, and an ending flag constituting the command frame Secondary Switch for operating the switching means to switch the associated remote stations to a primary connection to said other loop.

* * * * *